Patented Sept. 18, 1928.

1,685,058

UNITED STATES PATENT OFFICE.

BENJAMIN L. SOUTHER, OF PITTSBURGH, AND WILLIAM A. GRUSE, OF WILKINSBURG, PENNSYLVANIA, ASSIGNORS TO GULF REFINING COMPANY, OF PITTSBURGH, PENNSYLVANIA, A CORPORATION OF TEXAS.

PROCESS OF TREATING SLACK WAX.

No Drawing.    Application filed August 30, 1926. Serial No. 132,652.

This invention relates to processes of treating slack wax; and it comprises a process in which comminuted slack wax is washed with a solvent having a preferential solvent power for the oil normally found in slack wax resulting from pressing operations; all as more fully hereinafter set forth and as claimed.

In the usual manufacture of paraffin wax from petroleum, paraffin distillate is chilled to cause a crystallization of the contained wax which may amount to 20 per cent or so and the oil is separated from the residual crystallized wax. There is more liquid than solid and mechanical separation offers no difficulty. In the usual operation the chilled mass is pressed in a filter press or the like, giving a liquid oil for lubricating oil stock and cakes of solid wax. In the art, this material resulting from a pressing of chilled paraffin distillate is called "slack wax". While the removal of liquid by pressure in this operation is carried as far as is feasible, it is nevertheless not complete. The solid slack wax still contains oil, often 20 to 40 per cent, and must be subjected to further treatment to remove the residual oil and to regain waxes of various melting points. In the usual operation, the slack wax is melted and cooled again to such a temperature as will cause it to solidify to a solid cake. In so doing, much of the material, but not all, crystallizes, giving a sort of solid magma containing distributed liquid. In practice, further treatment is by sweating; that is, the material is placed in a hot chamber and the liquid components are allowed to drain away from the solid, an operation requiring considerable time. The sweating process may be, and frequently is, repeated; the sweated hard wax being remelted, recrystallized and once more sweated, while the oil sweated from the first stage may be again chilled for crystallization and resweating. The process is tedious and time-consuming and requires extensive chamber space.

Slack wax comes from the first presses as a solid cake and is usually regarded as consisting of a mixture of oil carrying wax in solution and wax containing oil in solid solution. We have found that this view is incorrect; that in slack wax at ordinary temperatures, the oil and wax exist as two distinct phases, one liquid and one solid, with the liquid phase containing substantially all the oil present, and no great amount of dissolved wax. The solid phase contains practically all the high melting wax in a nearly oil-free condition. Further pressure at the low temperature of recovery of the wax removes no more oil. This is probably due partly to the fact that the solution of soft wax in oil is solid at this temperature, and partly to the fact that such oil as remains liquid is entrapped in the crystal mass in such a way that it cannot be pressed out. At ordinary temperatures more of the material is liquid, but no practicable amount of the liquid can be removed by direct pressure on the slack wax because of the above mentioned fact, that the intermeshing crystals retain the liquid. We have found that if the structure which is presumably due to the interlocking of the crystals, be destroyed by comminution, cutting or grinding, the two phases are mechanically separable. As separated, these phases consist respectively of solid, practically oil-free wax, and oil saturated with wax at the prevailing temperature.

The structure of remelted and recrystallized slack wax is like that of the wax coming directly from the presses and the same considerations apply; it is possible to cut it up and obtain a fluent pumpable mass easily handled in a filter press or centrifugal. Similarly, secondary products obtained from filtrates or cakes by chilling or remelting and chilling, as the case may be, are amenable to our process. In every case, the temperature of separation is important.

In the present invention, slack wax is cut up, minced or hashed in any suitable way to form a fluent mass, liquid enough to be readily pumped and handled. Liquid and solid in this mass may be mechanically separated in any convenient way, such as by centrifuging or by filter pressing. We have found that an advantageous way of effecting this separation is by treating this fluent mass with a solvent having a preferential solvent power for the contained oil, and then separating the solids from the liquids, which gives a wax virtually free from adhering oil. We may first mechanically separate the solids and liquids in the comminuted slack wax and then wash the wax with a solvent for the oil. In the latter way of proceeding, the solid wax obtained as a result of the mechanical separation carries about 5 per cent of oil which exists as a film on the crystal surfaces of the wax. This oil may be readily removed by washing with a suitable solvent.

In a practical embodiment of the present invention, slack wax is cut up or ground by apparatus of any suitable type. As a result of the comminution, the solids in the mass are reduced to a fine granular crystalline material and this, with the oil present, forms a sort of suspension or magma of sufficient fluidity to be handled like a liquid at ordinary temperatures. The comminution and handling may conveniently be done at room temperature. A somewhat elevated temperature is often convenient as giving a harder wax. Slack wax coming from the original presses and at a temperature of about 30° F. may be warmed to bring it to about 80° F., cut up and then treated. A good type of comminution may be obtained by stirring solid slack wax with cutting blades mounted on a shaft, the blades rotating at a peripheral speed of about 250 feet per minute. A grinding device resembling a food chopper has been used with good results. The time of comminution is usually about 5 minutes or less.

However obtained, the comminuted slack wax is treated with an amount of a solvent having a preferential solvent power for, and miscible with, the oil, sufficient to dissolve the oil but not the wax. A suitable solvent will have only a slight solvent power for wax. As solvents for the present purposes, we have found various alcohols to be particularly advantageous. The following table shows the solvent power of certain alcohols for oil-free wax of a melting point of 124° F.

| Solvent: | Grams wax dissolved at 25° C. per 100 grams of solvent. |
|---|---|
| Ethyl alcohol | 0.2 |
| Isopropyl alcohol | 0.5 |
| Normal butyl alcohol | 3.5 |
| Secondary butyl alcohol | 3.4 |
| Tertiary butyl alcohol | 3.3 |
| Isobutyl alcohol | 3.3 |
| Iso amyl alcohol | 3.5 |
| Secondary amyl alcohol | 3.9 |

Other solvents may be used, such as ethyene dichlorid, acetone, acetone-benzene mixtures, alcohol and alcohol-benzene mixtures. The hexyl alcohols, especially secondary hexyl alcohol, are suitable for the present purposes. Alcohols made from pressure still gases can be used. These are customarily secondary and tertiary alcohols. These alcohols are characterized by having poor solvent power for wax, but possess suitable miscibility for oil. Mixtures of alcohols are useful. A mixture of propyl and butyl alcohols has been found useful. We have found, however, that for various practical reasons, the butyl alcohols are particularly useful in our process, this being especially true of normal butyl alcohol.

The mixture of comminuted slack wax and solvent may be separated into its solid and liquid constituents in any suitable type of apparatus, such as a filter press or a centrifuge. The solid wax remaining after the separation may be beaten up with further quantities of solvent and the separation process repeated.

The addition of a diluent liquid having a preferential solvent power for the oil, such as those liquids above mentioned, acts to lower the viscosity of the oil, thus favoring better drainage and lowering the total amount of oil adhering to the crystal surfaces.

Whereas we may directly incorporate comminuted slack wax with a solvent liquid, it is better for practical reasons, however, to first mechanically separate the solids and liquids in the comminuted slack wax in a suitable apparatus, such as a filter press or a centrifuge, and then either wash the separated wax in the filter press or centrifuge, or, after separation, grind the wax cake, which usually contains less than 5 per cent oil, with a solvent and then centrifuge.

As an example of our process, a quantity of ordinary slack wax made by the coking dry distillation of reduced midcontinent crude oil and then chilling and pressing of the paraffin distillate, was cut up and beaten at 78° F. by a rapidly rotating stirrer. After less than 5 minutes agitation, the solid wax was converted into a fluent material which flowed under its own weight. This was pumped to a filter press and pressed. The cake was solid dry wax with a melting point of 124° F. It contained 4.7 per cent oil and the yield was 60 per cent of the original slack wax. In lieu of a filter press, a centrifuge was often used with like results. The wax so obtained was then ground with butanol (i. e., butyl alcohol) and then centrifuged. Sufficient butanol was added to dissolve the adhering oil and form an easily handled mass. Wax obtained in this way was remarkably free from oil. The last traces of remaining oil were removed by regrinding the wax cake with further quantities of butanol or other solvent.

In general, it may be said that any liquid having a preferential solvent power for the oil normally contained in slack wax may be used. The solvents above described we have found to be especially suitable, but other solvents having the property of being miscible with oil and having a slight solvent power for the wax may be used.

In the claims, by an alcohol having from 3 to 6 carbon atoms, we mean to cover generically primary and secondary propyl alcohols; and primary, secondary and tertiary alcohols of the butyl, amyl and hexyl series, all of these having been found suitable for use in the process.

This application is a continuation in part of our application, Serial No. 88,906, filed February 17, 1926, which application describes the comminution of slack wax and the mechanical separation of comminuted slack wax into its solid and liquid constituents and discloses broadly the use of solvents as diluent liquids or as washing liquids in this connection. An apparatus for comminuting the slack wax to a fluent consistency is disclosed in the copending application of Gruse and Faragher, Serial No. 746,374, filed October 28, 1924, now Patent No. 1,663,592, patented March 27, 1928.

What we claim is:—

1. In the treatment of slack wax, the process which comprises comminuting solid slack wax to a fluent consistency, adding a solvent liquid having preferential solvent action on the oil and mechanically separating the solid components from the liquid components.

2. In the treatment of slack wax, the process which comprises comminuting solid slack wax to a fluent consistency, mechanically separating the bulk of the liquid oil present and removing residual oil by a solvent therefor.

3. In the treatment of slack wax, the process which comprises comminuting solid slack wax to a fluent consistency, mechanically separating the bulk of the liquid oil present, agitating the remaining solid wax with a solvent having a preferential solvent power for the remaining adhering oil, and then separating the solid constituents from the liquid constituents.

4. In the treatment of slack wax, the process which comprises comminuting solid slack wax to a fluent consistency, adding an alcohol having from 3 to 6 carbon atoms to the molecule, and mechanically separating the liquid and solids of the comminuted material.

5. In the treatment of slack wax, the process which comprises comminuting solid slack wax to a fluent consistency, mechanically separating the bulk of the liquid oil present and removing residual oil by a washing liquid comprising an alcohol having from 3 to 6 carbon atoms to the molecule.

6. In the treatment of slack wax, the process which comprises comminuting solid slack wax to a fluent consistency, mechanically separating the bulk of the liquid oil present, agitating the remaining solid wax with an alcohol having from 3 to 6 carbon atoms to the molecule, and then separating the solid constituents from the liquid constituents.

7. In the treatment of slack wax, the process which comprises comminuting solid slack wax to a fluent consistency, adding a butyl alcohol and mechanically separating the liquid and solids of the comminuted material.

8. In the treatment of slack wax, the process which comprises comminuting solid slack wax to a fluent consistency, mechanically separating the bulk of the liquid oil present and removing residual oil by a washing liquid comprising a butyl alcohol.

9. In the treatment of slack wax, the process which comprises comminuting solid slack wax to a fluent consistency, mechanically separating the bulk of the liquid oil present, agitating the remaining solid wax with a butyl alcohol and then separating the solid constituents from the liquid constituents.

10. In the treatment of slack wax, the process which comprises comminuting solid slack wax to a fluent consistency, adding normal butyl alcohol and mechanically separating the liquid and solids of the comminuted material.

11. In the treatment of slack wax, the process which comprises comminuting solid slack wax to a fluent consistency, mechanically separating the bulk of the liquid oil present and removing residual oil by a washing liquid comprising normal butyl alcohol.

12. In the treatment of slack wax, the process which comprises comminuting solid slack wax to a fluent consistency, mechanically separating the bulk of the liquid oil present, agitating the remaining solid wax with normal butyl alcohol and then separating the solid constituents from the liquid constituents.

In testimony whereof, we have hereunto affixed our signatures at Pittsburgh, Pennsylvania, this 27th day of August, 1926.

BENJAMIN L. SOUTHER.
WILLIAM A. GRUSE.